June 23, 1970 R. GROSSBACH 3,517,351

TUNABLE FERRIMAGNETIC FILTER USING A MAGIC-T

Filed Aug. 1, 1968

United States Patent Office 3,517,351
Patented June 23, 1970

3,517,351

TUNABLE FERRIMAGNETIC FILTER USING A MAGIC-T

Robert Grossbach, Brooklyn, N.Y., assignor to Loral Corporation, Scarsdale, N.Y.

Filed Aug. 1, 1968, Ser. No. 749,540
Int. Cl. H03h *7/10, 7/52;* H01p *5/12*
U.S. Cl. 333—73 1 Claim

ABSTRACT OF THE DISCLOSURE

A ferrimagnetic, band-pass filter employing a magic-T wave guide junction with a sphere of ferrimagnetic material in one of the arms of said T, permitting direct current magnetic field strengths of substantially lower magnitude than those required with conventional geometries.

This invention relates generally to the field of ferrimagnetic band-pass filters used in connection with the reception of relatively higher microwave frequencies. It is well known by workers in the art that a disadvantage of tunable ferrimagnetic band-pass filters of this type is the necessity for large magnetic fields in order to achieve resonance at such frequencies (above 20 gHz.). Such large magietic fields require heavy, bulky magnets, and high tuning powers. The high DC field requirement arises principally as a result of the "stacked" orthogonal waveguide configuration, which has previously been necessary to achieve high isolations outside the pass band.

It is therefore among the principal objects of the present invention to provide an improved construction in which the requirement for large magnetic fields has been substantially ameliorated.

Another object of the invention lies in the provision of an improved tunable ferrimagnetic filter having a wide variety of applications, and which may be constructed at cost directly comparable to existing prior art devices.

Yet another object of the invention lies in the provision of an improved tunable ferrimagnetic filter which may be used to replace a wide variety of existing geometries to perform a corresponding function at much lower magnetic field strengths.

These objects, as well as other incidental ends and advantages, will more fully appear in the progress of the following disclosures, and pointed out in the appended claims.

Before beginning a detailed consideration of the structural aspects of the invention, a brief review of the prior art is believed apposite.

Figures 1, 2, 3:
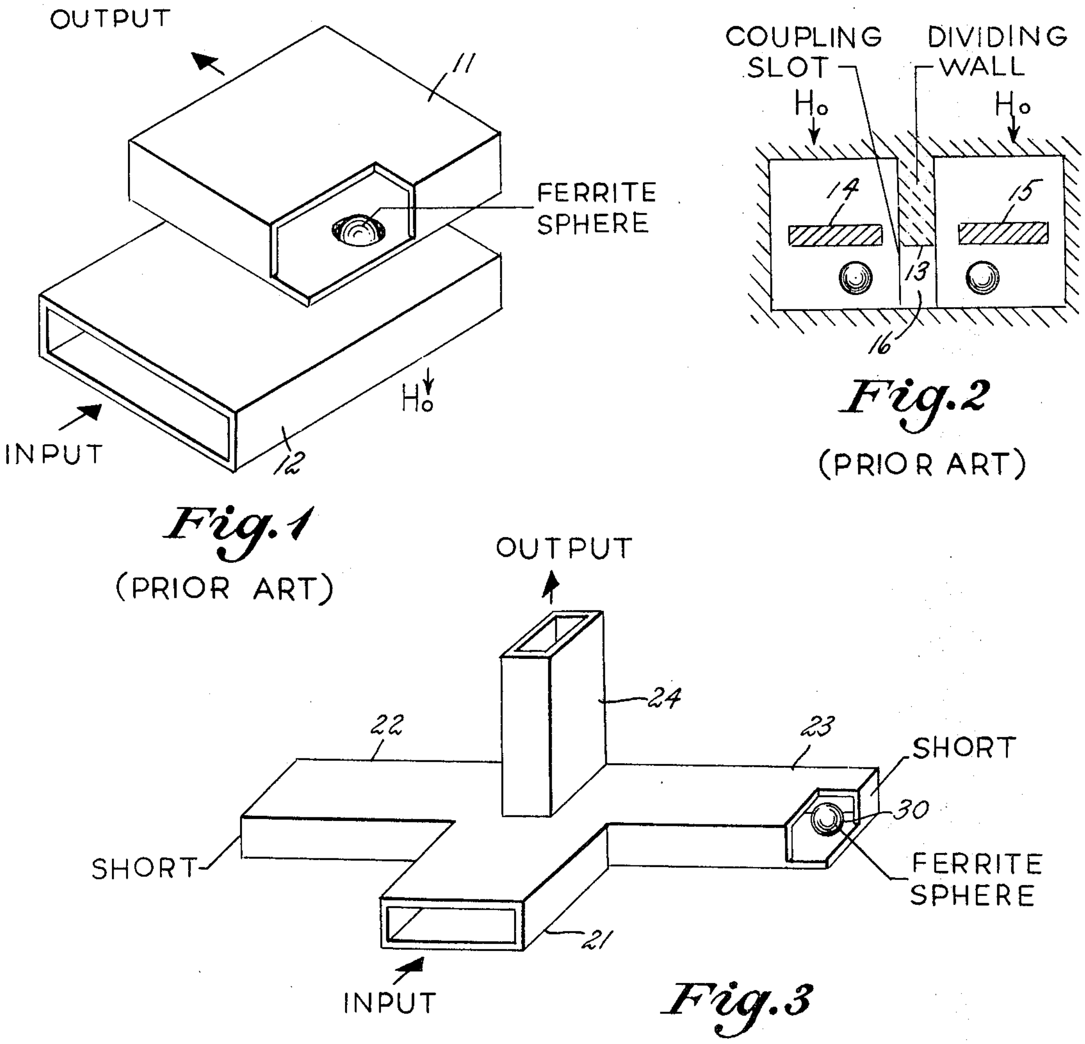
FIG. 1 is a schematic fragmentary view in perspective showing a presently existing prior art construction.
FIG. 2 is a schematic drawing of an improved prior art construction.
FIG. 3 is a schematic perspective view, partially broken away to show detail of an embodiment of the invention.

Referring to FIG. 1, there is illustrated a geometry of a conventional type, wherein it may be observed that the external DC tuning field ($H_0$) must bridge the height of two stacked waveguides, 11 and 12.

In an effort to ameliorate the high field problem, Carter[1] has proposed the configuration of FIG. 2, which achieves isolation by means of a cut-off section of waveguide, 13 between input and output lines, 14 and 15. This

[1] P. S. Carter, "Side-Wall-Coupled, Strip-Transmission-Line Magnetically Tunable Filters Employing Ferrimagnetic YIG Resonators," IEEE Trans. Microwave Theory and Techniques, vol. MTT-13, pp. 306–315, May 1965.

configuration, however, has several disadvantages. It requires a minimum of two ferrimagnetic resonators, tends to introduce magnetostatic modes as a result of assymmetries, and also imposes a trade-off between maximum values of sphere-to-sphere coupling and off-band isolation. Additional difficulties are caused by the presence of the slot 16, which, as Carter points out, decreases coupling from the external circuit to the spheres and reduces the unloaded Q factors of the resonators.

Figure 4:
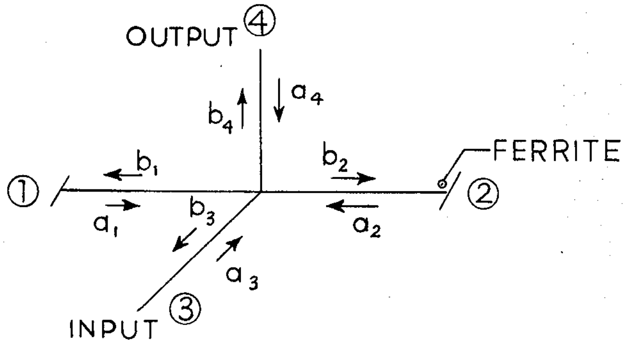
FIG. 4 is a diagram showing the incident and reflected waves present in the embodiment shown in FIG. 3 during use.

In the geometry presently disclosed, and illustrated in FIG. 3, the above mentioned disadvantages are alleviated, while the advantages of a non-stacked configuration are still retained. As is known in the art, if the co-linear arms of a magic-T are short-circuited at equal distances from the center of the junction, and an input signal is applied to the sum arm, practically no signal appears in the difference arm. This isolation is dependent solely upon mechanical symmetry, and typically, may be greater than 30 db. If a resonant, overcoupled ferrite sphere is placed directly in front of one of the co-linear arm short circuits, the phase of reflection will be changed to that of an open circuit. If there were no losses, and the junction were perfect, complete transmission would result from sum to difference ports. For the lossy case, the actual transmission may be derived as follows:

Referring to FIG. 4 in the drawing, let $$\Gamma 2=\frac{a_2}{b_2}\Big| =1-\alpha \text{ at plane of ferrite}$$

$$\Gamma 1=\frac{a_1}{b_2}\Big| =-1 \text{ at plane of short}$$

$$\Gamma 4=0=\frac{a_4}{b_4}$$

$$(2)\ \frac{b_4}{a_3}=\frac{-1-1+\alpha}{2}=-1+\frac{\alpha}{2}$$

Then, $$\text{Output power}=P_4=1/2\left[\left(-1+\frac{\alpha}{2}\right)a_3\right]^2$$

$$T=\frac{\text{Output power}}{\text{Input power}}=\frac{P_4}{P_3}=\left(1-\frac{\alpha}{2}\right)^2$$

since $$P_3=\tfrac{1}{2}a_3^2 \qquad (2)$$

At resonance, for the overcoupled case, looking into arm, $$VSWR=S=\frac{Q_u}{Q_E}$$

where $Q_u$=unloaded Q of resonator
$Q_E$=external Q of resonator and the reflection coefficient is, $$|\Gamma|=\frac{S-1}{S+1}=1-\alpha \qquad (4)$$

Thus, $$\alpha=\frac{2}{S+1}=\frac{2}{\frac{Q_u}{Q_E}=1}$$

and $$T=\left(1-\frac{1}{\frac{Q_u+1}{Q_E}}\right)^2=\left(\frac{1}{\frac{1+Q_E}{Q_u}}\right)^2 \qquad (5)$$

[2] V. Altman, Microwave Circuits, 1964, The Van Nostrand Co., pp. 60–71.

It is observed that (5) is the same transmission function one would obtain from any conventional band-pass filter.

The magic-T configuration is believed to be the only practical geometry in which a single-sphere, band-pass filter retains the important advantage of a DC magnetic field that bridges but a single wave guide height. When the distances from the center of the T to the short circuits are equal, the isolation will be high (typically 30 db) and substantially independent of frequency. The technique may be extended further by cascading several spheres in front of the short circuit to obtain multi-resonator response characteristics. It should be noted, however, that practically realizable mechanical tolerances may limit ultimate isolation to less than 50 db, and consequently, the number of filter stages to two or fewer. Since no coupling apertures are in proximity to the spheres, the degrading effects of such apertures are avoided. Well-matched magic-T junctions are available covering every major frequency range.

In the embodiment disclosed in FIG. 3, there is disclosed a conventional magic-T junction, including an input arm, 21, short arms, 22 and 23, and an output arm, 24. The output arm, 24 is subjected to a DC magnetic field, $H_0$; and within the arm 24 there is located a 30 mil diameter YIG sphere having a linewidth of 1 oe. The sphere is indicated by reference character 30. With the disclosed embodiment, the measured isolation from 30–40 gHz. exceeded 28 db. Bandwidths varied from 20–50 mHz., and insertion loss was less than 2.25 db.

I wish it to be understood that I do not consider the invention limited to the precise details or structure shown and set forth in this specification, for obvious modifications will occur to those skilled in the art to which the invention pertains.

I claim:

1. A ferrimagnetic band-pass filter comprising a magic-T waveguide having an input arm, an output arm, and a pair of laterally extending shorted arms, a ferrimagnetic element disposed within one of said shorted arms, said last mentioned shorted arm being subjected to a DC magnetic field.

References Cited

UNITED STATES PATENTS

| | | | |
|---|---|---|---|
| 3,290,625 | 12/1966 | Bartram et al. | 333—73 |
| 3,400,343 | 9/1968 | Carter | 333—24.2 X |
| 3,426,297 | 2/1969 | Cohen | 333—73 X |

HERMAN KARL SAALBACH, Primary Examiner

M. NUSSBAUM, Assistant Examiner

U.S. Cl. X.R.

333—11, 24.2